(12) United States Patent
Kozel

(10) Patent No.: US 11,248,619 B2
(45) Date of Patent: Feb. 15, 2022

(54) CONSTRUCTION OF ARTICLES OF MANUFACTURE OF FIBER REINFORCED STRUCTURAL COMPOSITES

(71) Applicant: John A. Kozel, Basking Ridge, NJ (US)

(72) Inventor: John A. Kozel, Basking Ridge, NJ (US)

( * ) Notice: Subject to any disclaimer, the term of this patent is extended or adjusted under 35 U.S.C. 154(b) by 792 days.

(21) Appl. No.: 16/108,455

(22) Filed: Aug. 22, 2018

(65) Prior Publication Data

US 2018/0355881 A1 Dec. 13, 2018

Related U.S. Application Data

(62) Division of application No. 15/007,349, filed on Jan. 27, 2016, now Pat. No. 10,273,970.

(51) Int. Cl.
*F04D 29/24* (2006.01)
*B29C 70/54* (2006.01)
(Continued)

(52) U.S. Cl.
CPC .............. *F04D 29/24* (2013.01); *B29C 70/24* (2013.01); *B29C 70/34* (2013.01); *B29C 70/545* (2013.01);
(Continued)

(58) Field of Classification Search
CPC ..... F04D 29/24; F04D 29/30; B32B 2603/00; B32B 5/024; B32B 5/06; B32B 5/08; B32B 5/10; B32B 5/12; B32B 5/26; B32B 2262/0269; B32B 2262/106; B32B 2307/50; B32B 2260/046; B32B 2260/023; B32B 2262/101; B29C 70/545;
(Continued)

(56) References Cited

U.S. PATENT DOCUMENTS 2,165,808 A * 7/1939 Murphy ................ F04D 29/242
416/186 R
3,082,695 A * 3/1963 Buschhorn ............ F04D 29/225
416/176

(Continued)

FOREIGN PATENT DOCUMENTS

EP 0402099 A2 12/1990

*Primary Examiner* — Kenneth Bomberg
*Assistant Examiner* — Adam W Brown
(74) *Attorney, Agent, or Firm* — Richard M. Goldberg

(57) ABSTRACT

Articles of manufacture, preferably pump component parts, and a method for making the articles, include providing a plurality of layers of reinforcing fibers in a stack of consecutive layers in a matrix of synthetic polymeric material. The reinforcing fibers of different layers are of corresponding different materials, and the layers are arranged such that the material of the reinforcing fibers in each layer is different from the material of the reinforcing fibers in the next consecutive layer. The layers are stitched together with further reinforcing fibers extending within the stack essentially perpendicular to the layers and interspersed throughout the stack. The stack is compressed and cured to establish a block having a plurality of layers of reinforcing fibers and further reinforcing fibers in a matrix of synthetic polymeric material. The block is machined to establish a prescribed configuration of a desired article.

1 Claim, 7 Drawing Sheets

(51) Int. Cl.
    *B29C 70/24* (2006.01)
    *B29C 70/34* (2006.01)
    *B32B 5/02* (2006.01)
    *B32B 5/06* (2006.01)
    *B32B 5/08* (2006.01)
    *B32B 5/10* (2006.01)
    *B32B 5/12* (2006.01)
    *B32B 5/26* (2006.01)
    *F04D 29/30* (2006.01)

(52) U.S. Cl.
    CPC ............... *B32B 5/024* (2013.01); *B32B 5/06* (2013.01); *B32B 5/08* (2013.01); *B32B 5/10* (2013.01); *B32B 5/12* (2013.01); *B32B 5/26* (2013.01); *F04D 29/30* (2013.01); *B32B 2260/023* (2013.01); *B32B 2260/046* (2013.01); *B32B 2262/0269* (2013.01); *B32B 2262/101* (2013.01); *B32B 2262/106* (2013.01); *B32B 2307/50* (2013.01); *B32B 2603/00* (2013.01)

(58) Field of Classification Search
    CPC . B29C 70/24; F05D 2200/23; F05D 2200/24; F05D 2200/26; F05D 2200/261; F05D 2200/262
    See application file for complete search history.

(56) References Cited

U.S. PATENT DOCUMENTS

| | | | | |
|---|---|---|---|---|
| 4,540,334 | A * | 9/1985 | Stahle | F04D 29/225 |
| | | | | 415/121.1 |
| 4,622,254 | A | 11/1986 | Nishimura et al. | |
| 5,934,877 | A * | 8/1999 | Harman | F04D 29/245 |
| | | | | 416/223 R |
| 6,142,736 | A * | 11/2000 | Arbeus | F04D 29/183 |
| | | | | 416/185 |
| 6,881,288 | B2 * | 4/2005 | Davies | B29C 70/081 |
| | | | | 156/148 |
| 7,037,069 | B2 * | 5/2006 | Arnold | F04D 7/045 |
| | | | | 415/128 |
| 7,096,934 | B2 * | 8/2006 | Harman | F28D 7/028 |
| | | | | 165/177 |
| 7,416,385 | B2 * | 8/2008 | Harman | F01D 9/026 |
| | | | | 415/204 |
| 7,488,151 | B2 * | 2/2009 | Harman | F04D 29/4226 |
| | | | | 415/71 |
| 7,673,834 | B2 * | 3/2010 | Harman | F42B 10/24 |
| | | | | 244/199.1 |
| 10,273,970 | B2 * | 4/2019 | Kozel | F04D 29/24 |
| 2005/0186081 | A1 | 8/2005 | Mohamed | |
| 2012/0051955 | A1 * | 3/2012 | Hadar | F04C 11/008 |
| | | | | 417/410.3 |
| 2012/0234538 | A1 | 9/2012 | Martin et al. | |
| 2013/0064705 | A1 * | 3/2013 | Sekiya | F04C 18/321 |
| | | | | 418/241 |

* cited by examiner

CONSTRUCTION OF ARTICLES OF MANUFACTURE OF FIBER REINFORCED STRUCTURAL COMPOSITES

This application is a division of application Ser. No. 15/007,349, filed Jan. 27, 2016, the full disclosure of which application is incorporated herein by reference thereto.

The present invention relates generally to the manufacture of mechanical component parts and pertains, more specifically, to the construction of articles of manufacture and, more particularly, impellers, pump casings, pump casing back plates and related component parts constructed of fiber reinforced structural composites.

The use of fiber reinforced structural composites has become widespread in the manufacture of mechanical component parts. It is well known to construct a block of composite materials in which reinforcing fibers are arranged within a matrix of synthetic polymeric material, with the fibers oriented to provide optimum strength commensurate with the configuration of the mechanical component to be machined from the block. In an earlier patent, U.S. Pat. No. 5,840,399, there is described articles of manufacture and methods by which such articles are constructed of fiber reinforced structural composites.

The present invention provides a structural composite having an arrangement of reinforcing fibers in a matrix of synthetic polymeric materials for enabling an improvement in particular articles of manufacture, such as pump casings, pump casing back plates and related component parts and, in particular, pump impellers, in which axially extending elements, such as impeller vanes, are unitary with a radially extending element, such as a rotor, in an effective and efficient one-piece design and construction of high strength and exceptional durability. As such, the present invention attains several objects and advantages, some of which are summarized as follows: Provides a structural composite of strength and durability, reinforced in directions commensurate with the configuration of the component constructed from the structural composite; enables the reinforcement of a mechanical component in three mutually perpendicular directions by virtue of reinforcing fibers being continuously interwoven in a tri-dimensional weave, without discontinuities in a fiber in any one direction in any one plane, for enhanced strength and durability in mechanical components constructed from structural composites; enables the reinforcement of a mechanical component in three mutually perpendicular directions for enhanced strength and durability in mechanical components constructed of structural composites having a matrix of synthetic polymeric materials; provides mechanical component parts constructed of structural composites that impart to the component parts insulating properties which avoid galvanic corrosion or electrolysis that otherwise would affect longevity and performance of the component parts; provides an improved impeller and pump casing construction in which the configuration of corresponding vanes enables increased efficiency, reduced noise, reduced vibration, and reduced cavitation; provides pumps with component parts having greater wear resistance for effective operation with more abrasive fluids; provides pumps with component parts having greater resistance to corrosion; enables the economical manufacture of mechanical components, and especially impellers and related component parts of pumps, of uniform high quality and rugged construction for exemplary performance over an extended service life.

The above objects and advantages, as well as further objects and advantages, are attained by the present invention which may be described briefly as an impeller having a rotor extending in radial directions from a central axis to an outer periphery and a plurality of vanes unitary with the rotor and extending from the rotor in axial directions essentially parallel to the central axis, each vane having a length along an axial direction, the further reinforcing fibers extending within each vane, along the length of each vane, essentially parallel to the length of the vanes, and into the rotor, the improvement wherein each vane extends between the central axis and the outer periphery along a volute defined by the mathematical formula $$Y = e^{(0.01a)} \times (5/8)(r) \times \cos(\theta) + (1/2)$$

$$X = e^{(0.01a)} \times (r) \times \sin(\theta) + (3/4)$$

Where $a = (33/64) \times (r)$; $r$ = radius; $e = 2.718$.

The invention will be understood more fully, while still further objects and advantages will become apparent, in the following detailed description of preferred embodiments of the invention illustrated in the accompanying drawing, in which.

Figure 1:
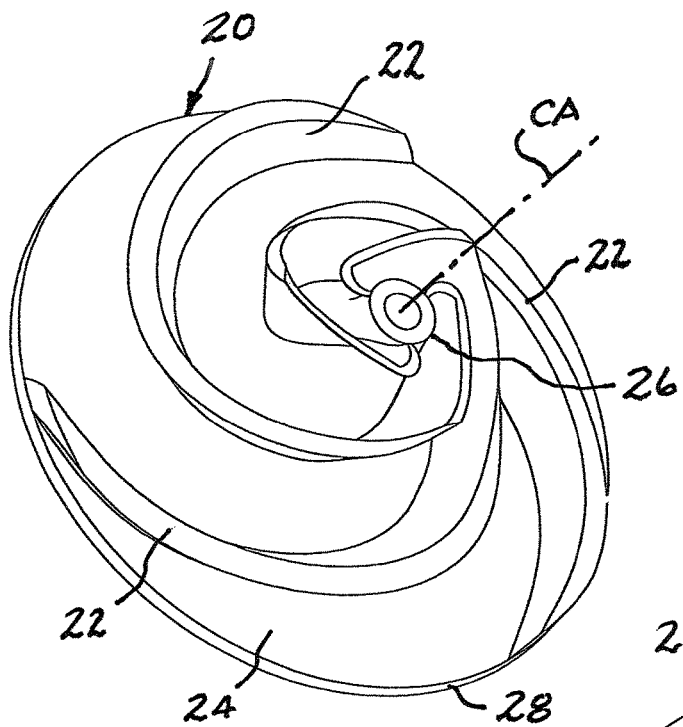
FIG. 1 is a pictorial view of a pump impeller constructed in accordance with the present invention.
Figure 2:
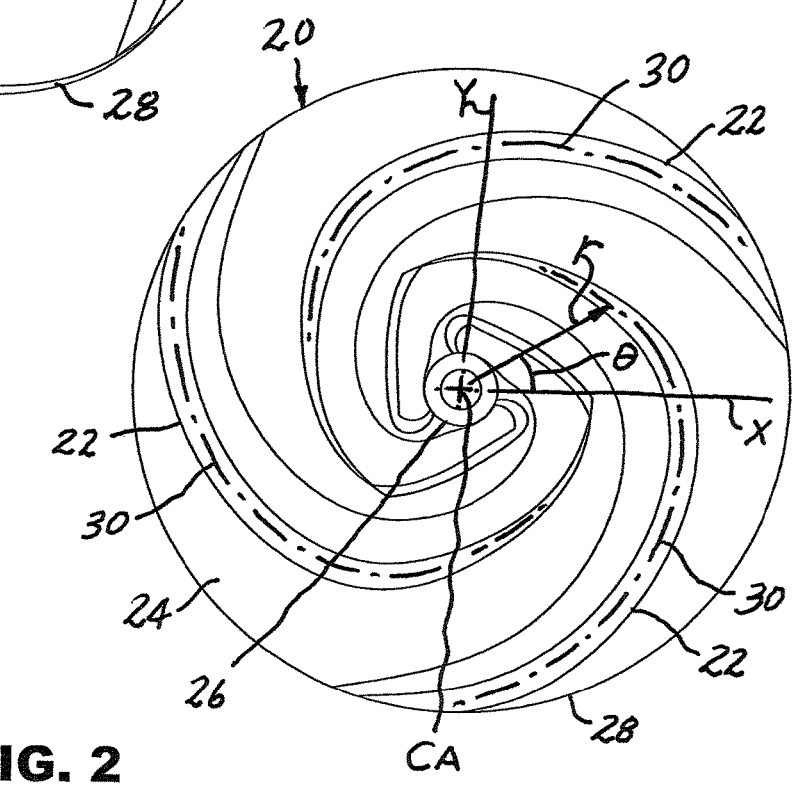
FIG. 2 is a somewhat diagrammatic plan view of the pump impeller illustrating the geometric configuration of the impeller.

Referring now to the drawing, and especially to FIGS. 1 and 2 thereof, an impeller constructed in accordance with the present invention is shown at 20 and is seen to include vanes 22 extending in an axial direction from a radial portion in the form of a rotor 24 which extends in radial directions from a central hub 26. The vanes 22 are shown unitary with the rotor 24 and extend between a central axis CA and an outer periphery 28, with each vane 22 preferably extending from the hub 26 to the outer periphery 28 of the impeller 20. Each vane 22 follows a volute 30 having a configuration expressed by the following mathematic formula:

$$Y = e^{(0.01a)} \times (5/8)(r) \times \cos(\theta) + (1/2)$$

$$X = e^{(0.01a)} \times (r) \times \sin(\theta) + (3/4)$$

Where $a = (33/64) \times (r)$; $r$ = radius; $e = 2.718$

Volute 30, constructed in accordance with the above mathematical formula, provides impeller 20 with maximized efficiency and flow, with reduced cavitation. In addition, vibration and noise are reduced. A complementary volute is incorporated into the pump casing (not shown) and any diffuser vanes (also not shown) so as to accept impeller 20 into a fully constructed pump that exhibits the advantages set forth above.

Figure 3:
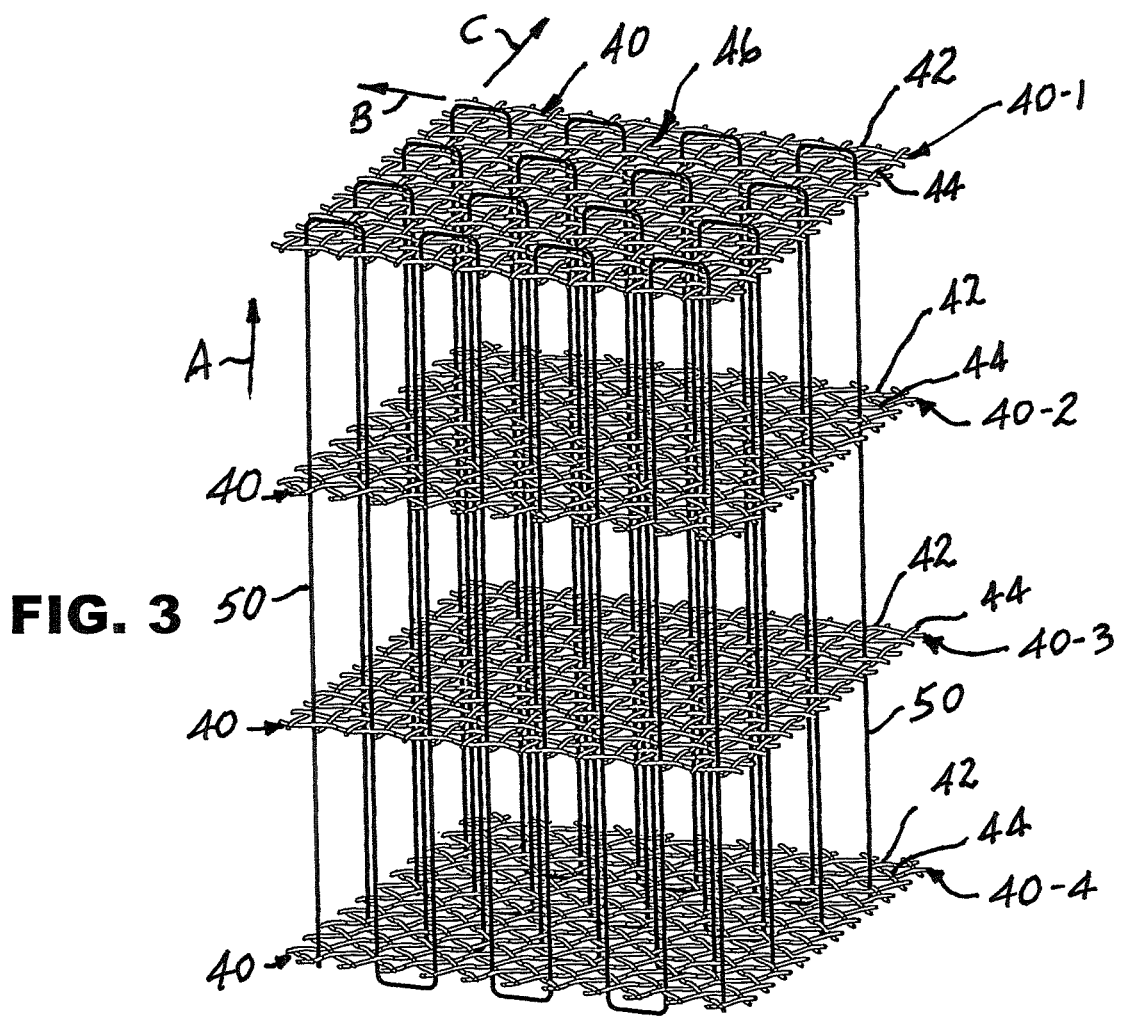
FIG. 3 is a diagrammatic pictorial illustration showing a step in the method of the present invention.
Figure 4:
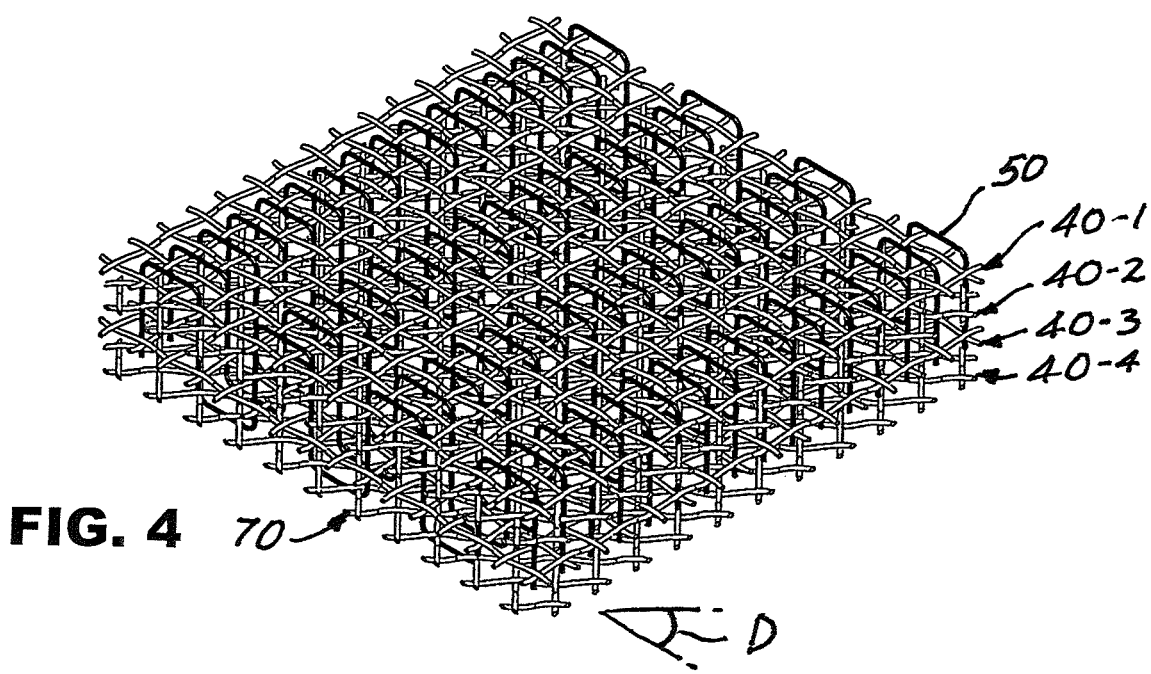
FIG. 4 is a diagrammatic illustration showing a further step in the method of the present invention.

Turning now FIGS. 3 through 9, impeller 20 advantageously is constructed of a fiber reinforced structural composite, in accordance with the following procedure. As best seen in FIGS. 3 and 4, a plurality of layers 40 include reinforcing fibers 42 and 44 woven into a pattern 46, which pattern 46 preferably is in the form of an orthogonal pattern in which the reinforcing fibers 42 and 44 extend essentially perpendicular to one another, that is, fibers 42 are oriented at 90° relative to fibers 44. The reinforcing fibers 42 and 44 are embedded in a matrix 48 of synthetic polymeric material, in a manner described more fully in the aforesaid U.S. Pat. No. 5,840,399.

The layers 40 are stacked along an axial direction A, with the reinforcing fibers 42 and 44 of each layer 40 extending in orthogonal directions B and C, transverse to axial direction A. Within the stacked layers 40, each layer 40 is rotated about the axial direction A with respect to a next consecutive adjacent layer 40, as illustrated in FIG. 3 where the reinforcing fibers 42 and 44 of layer 40-2 are rotated through an angular displacement D relative to the reinforcing fibers 42 and 44 of layer 40-1. Likewise, the next adjacent layer 40-3 is rotated through an angular displacement D relative to layer 40-2, and the layer 40-4, next adjacent to layer 40-3, is rotated through an angular displacement D relative to layer 40-3. In the preferred construction, the angular displacement D is about 45°.

Further reinforcing fibers 50 are extended through the juxtaposed, stacked layers 40, reinforcing fibers 50 preferably extending essentially parallel to the axial direction A. Once the stacking operation is completed, the layers 40 are stitched together with the reinforcing fibers 50 extending essentially in the axial direction A, as shown in FIG. 3. The stitching fibers 50 extend throughout the length and width of the stacked layers 40 and are interspersed among the reinforcing fibers 42 and 44 to provide reinforcement throughout a completed stack 70, shown in FIG. 4, essentially parallel to the height of the stack 70, in axial directions. In addition, the stitching provided by the fibers 50 secures together the layers 40 in the stack 70. In the preferred procedure, additional synthetic polymeric matrix material is injected into the stitched stack 70 to assure that reinforcing fibers 42 and 44, together with further reinforcing fibers 50, all are fully embedded within a surrounding matrix of synthetic polymeric matrix material.

Figure 5:
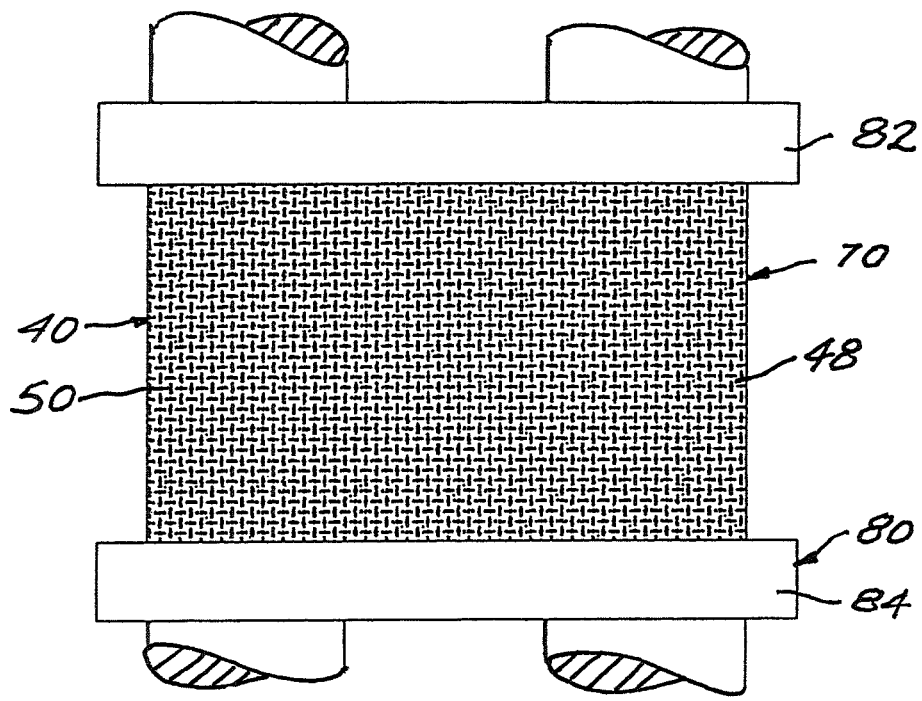
FIG. 5 is a diagrammatic illustration of a still further step carried out in accordance with the method of the present invention.

The stack 70 then is placed in a press 80, as illustrated in FIG. 5, between platens 82 and 84, and is compressed and cured, at a preferred pressure of about 2,000 psi and a preferred temperature of about 600° F. The resulting block 90 of composite material, illustrated in FIG. 6, has a height along the axial direction A which is approximately one-half the height of the stack 70 when first introduced into press 80. Accordingly, the stack 70 is constructed with a height approximately twice that which is desired in the completed block 90. The curing time in the press 80 is about two hours per inch of the height of the completed block 90 along the axial direction A. For example, a block 90 having a length and width of four feet and a height of eight inches requires a stack 70 of sixteen inches and a curing time in press 80 of approximately sixteen hours. Typically, a block 90 with a length and width of four feet can have a height of from one inch to forty-eight inches; however, other dimensions are feasible.

The reinforcing fibers 42, 44 and 50 include a combination of graphite fibers, aramid fibers and soft glass fibers. In the preferred construction, the reinforcing fibers 42 and 44 are selected from the group consisting of graphite fibers, aramid fibers and soft glass fibers. The graphite fibers are non-conductive and preferably have a thickness of approximately 0.032 inch. The further reinforcing fibers 50 preferably are soft glass fibers. A preferred composition includes about 25% to 30% graphite fibers, about 25% to 30% aramid fibers, and about 40% to 50% soft glass fibers. The synthetic polymeric matrix material is a hybrid resin system containing approximately equal percentages of epoxy thermoset resin and phenolic thermoset resin, preferably combined with approximately 10% by volume of a loose graphite additive. The preferred ratio of reinforcing fibers 42, 44 and 50 to resin matrix 48 is approximately sixty to sixty-five percent fibers to forty to thirty-five percent hybrid resin matrix.

The reinforcing fibers 42 and 44 of different layers 40 are of corresponding different materials, with the layers 40 being arranged in stack 70 such that the material of the reinforcing fibers 42 and 44 in each layer 40 is different from the material of the reinforcing fibers 42 and 44 of the next consecutive adjacent layer 40. Thus, with reference to FIGS. 3 and 4, the material of reinforcing fibers 42 and 44 in layer 40-2 is different from the material of reinforcing fibers 42 and 44 in layer 40-1, and the material of reinforcing fibers 42 and 44 in layer 40-3 is different from the material of reinforcing fibers 42 and 44 in layer 40-2, while the material of reinforcing fibers 42 and 44 in layer 40-4 is different from the material of reinforcing fibers 42 and 44 in layer 40-3. In this manner, the combination of reinforcing fibers and resin matrix provides structural composite block 90 with a semi-isotropic construction in which the mechanical properties of the composite structure are within 100 psi tensile strength in the B and C directions, thereby maintaining maximum physical properties in all products manufactured from a composite block 90, as will be described below.

Figure 6:
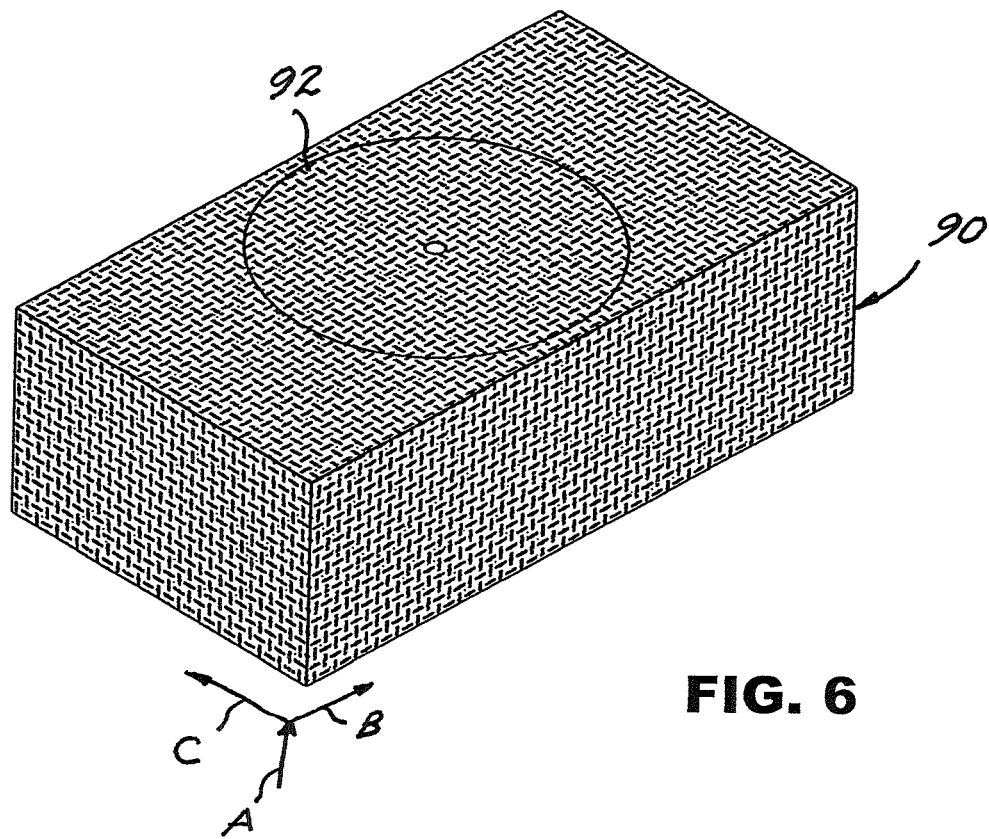
FIG. 6 is a diagrammatic illustration of yet another step carried out in accordance with the present invention.
Figure 7:
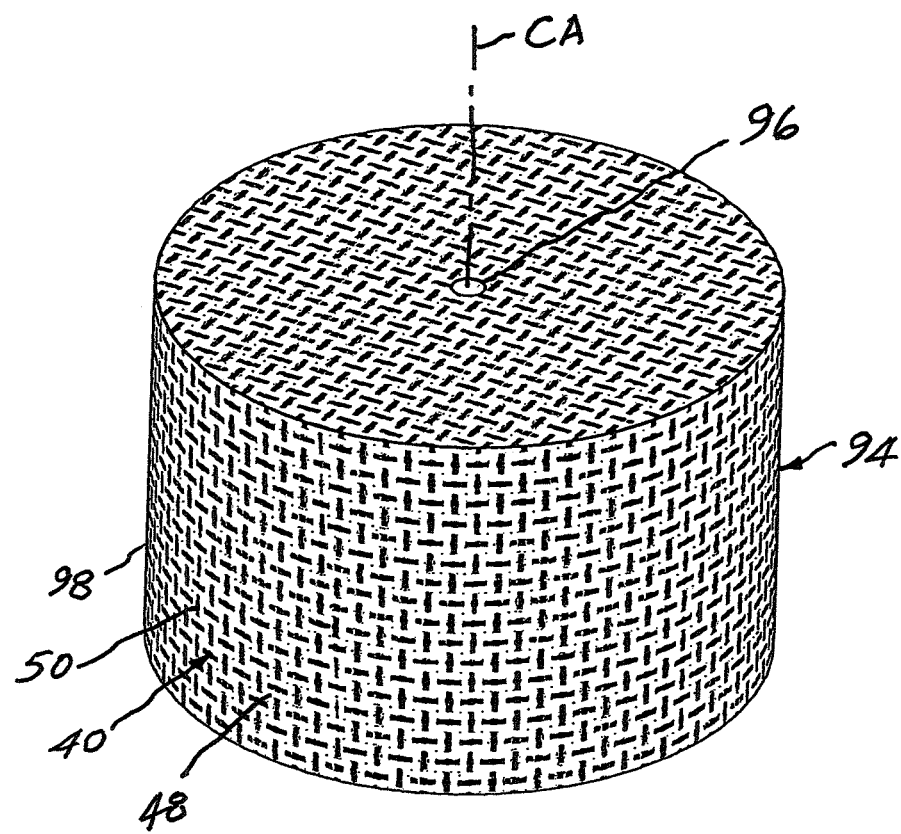
FIG. 7 is a pictorial illustration of an intermediate blank formed as a part of the procedure carried out in accordance with the present invention.

Referring now to FIGS. 6 through 9, an article of manufacture is shown being constructed in accordance with the present invention, the article of manufacture being illustrated in the form of an improved impeller 100. As seen in FIG. 6, the block 90 of composite material has been removed from the press 80 and marked at 92 with the outline of a blank to be cut from the block. A blank 94 then is cut from the block 90, the blank 94 being provided with a central opening 96 along a central axis CA and extending radially from the central axis CA to an outer periphery 98.

Figure 8:
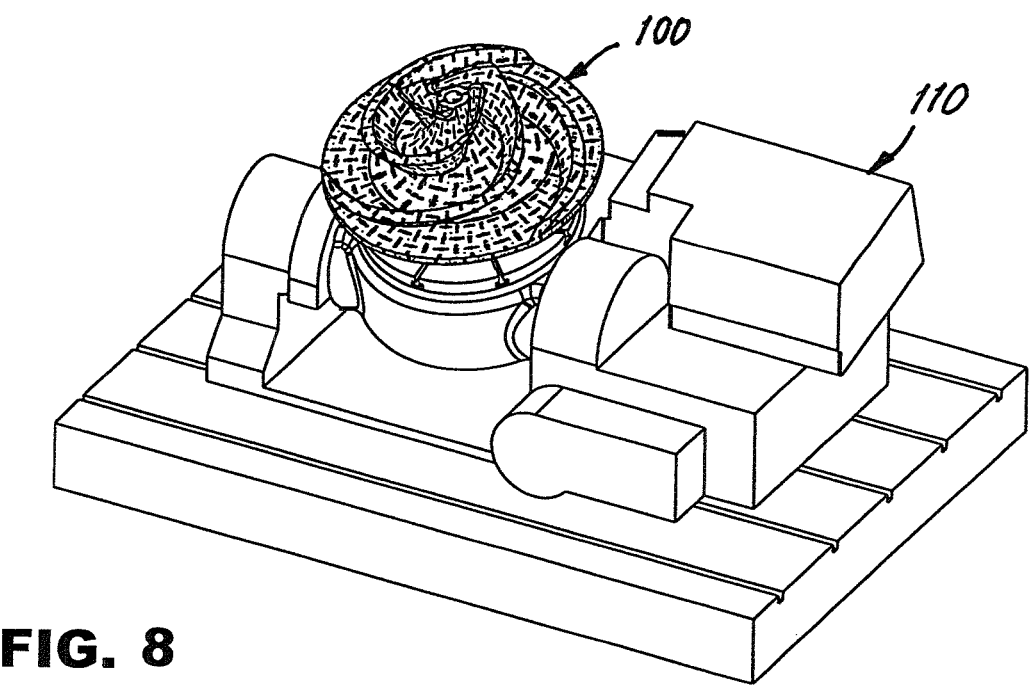
FIG. 8 is a diagrammatic pictorial illustration of another operation carried out in accordance with the present invention.
Figure 9:
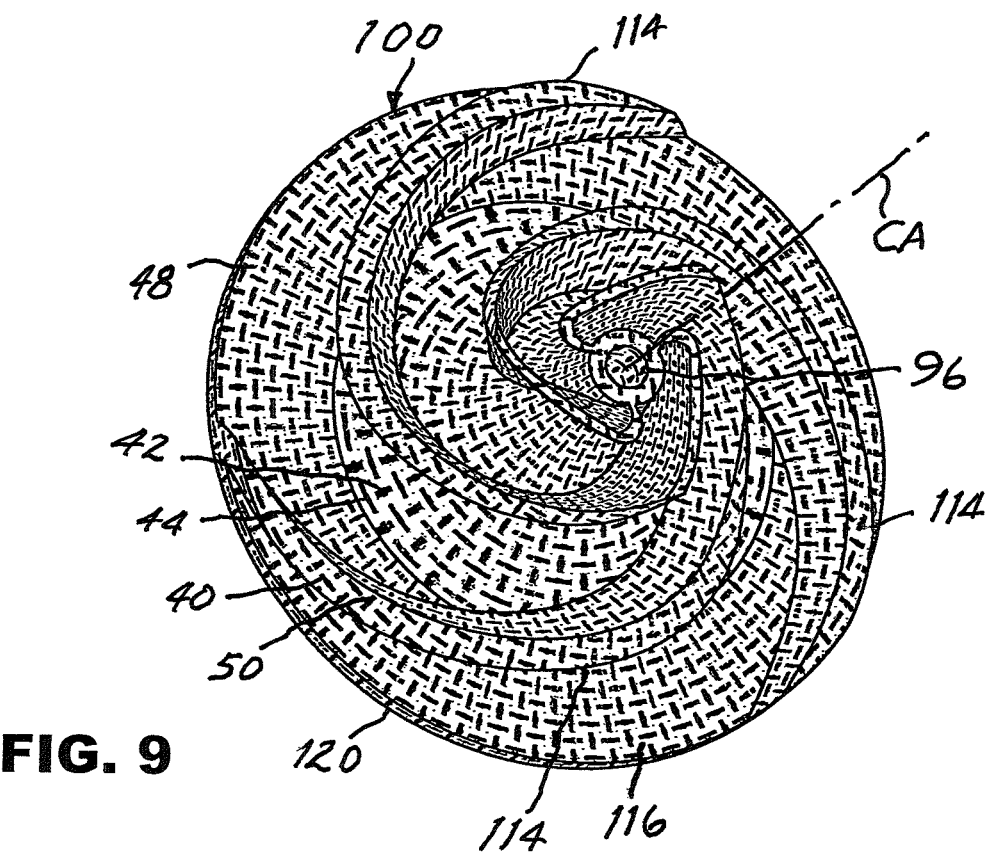
FIG. 9 is a pictorial illustration of an impeller constructed in accordance with the procedure of the present invention.

Turning now to FIG. 8, the blank 94 is placed in a five to eight axis computerized numerically controlled (CNC) machining apparatus 110 where a computer controlled sequence of operations machines axial portions in the form of impeller vanes 114 which extend in axial directions essentially parallel to the central axis CA. Upon completion of the machining operation, impeller 100 is created with several vanes 114 extending axially from a radial portion in the form of a rotor 116 which extends in radial directions from central opening 96, as shown in FIG. 9. The vanes 114 are unitary with the rotor 116 in a structural composite having the plurality of layers 40 of reinforcing fibers in a matrix 48 of synthetic polymeric material, each layer 40 extending essentially parallel to the radial directions, with the layers 40 being juxtaposed with one another along the axial direction.

The pattern of reinforcing fibers 42 and 44 follows the pattern established in the stack 70; that is, the pattern of the reinforcing fibers 42 and 44 in each layer 40 is an orthogonal pattern and the reinforcing fibers 42 and 44 in each layer 40 is rotated about the central axis CA, preferably by 45°, relative to the next adjacent layer 40. The further reinforcing fibers 50 extend in the axial directions and are stitched through the juxtaposed layers 40, the further reinforcing fibers 50 extending within each vane 114, along the length of each vane 114, essentially parallel to the length of the vanes 114, and into the rotor 116 so as to reinforce each vane 114 and the integration of the vanes 114 and the rotor 116. The reinforcing fibers 42 and 44 of each layer 40 and the further reinforcing fibers 50 preferably are mutually perpendicular. The impeller 100 is completed by conventional machining operations to shape the outer periphery 120, and to finish other details of construction.

The unitary, composite construction of the impeller 100 establishes a mechanical component part of high strength and exceptional durability. The nature of the composite material enables a high degree of resistance to wear, abrasion and corrosion. The mutually perpendicular arrangement of the reinforcing fibers 42, 44, and 50 in the matrix 48 of synthetic polymeric material, and especially the fibers 50 extending axially along the vanes 114, and into rotor 116, provides added strength and rigidity for exemplary performance, as well as increased durability for a long service life.

Figure 10:
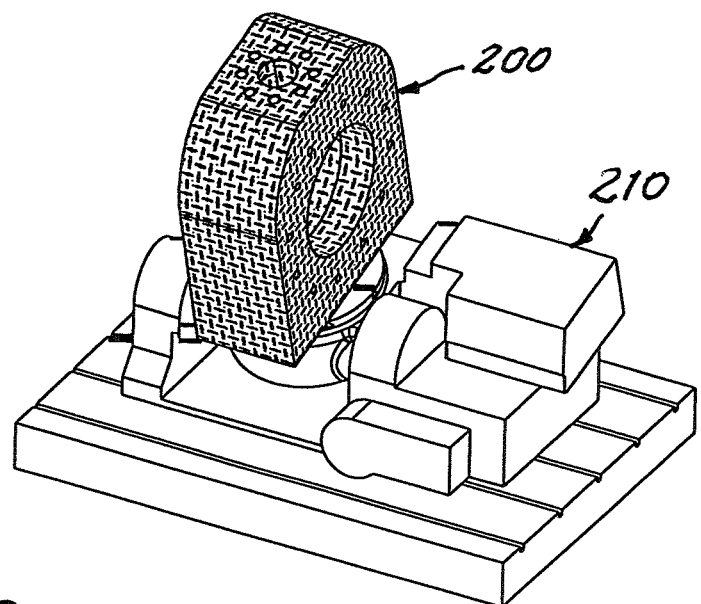
FIG. 10 is a diagrammatic pictorial illustration of another operation carried out in accordance with the present invention.
Figure 11:
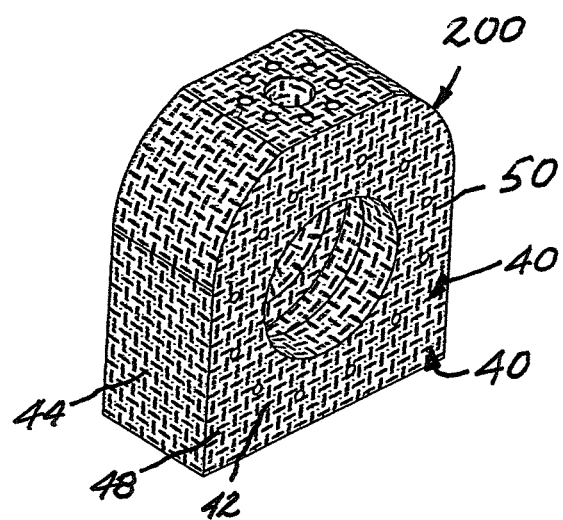
FIG. 11 is a pictorial illustration of a pump casing constructed in accordance with the procedure of the present invention.

With reference now to FIGS. 10 and 11, another component part of a pump is shown in the form of a pump casing 200 constructed through utilization of much the same procedure; that is, blank 94 has been placed into a computerized numerically controlled (CNC) machining apparatus 210 where a computer controlled sequence of operations has machined the basic configuration of the pump casing 200. Here again, the unitary, composite construction provided to the pump casing 200 establishes a mechanical component part of high strength and exceptional durability. The nature of the composite material enables a high degree of resistance to wear, abrasion and corrosion. The mutually perpendicular arrangement of the reinforcing fibers 42, 44, and 50 in the matrix 48 of synthetic polymeric material provides added strength and rigidity for exemplary performance, as well as increased durability for a long service life.

Figure 12:
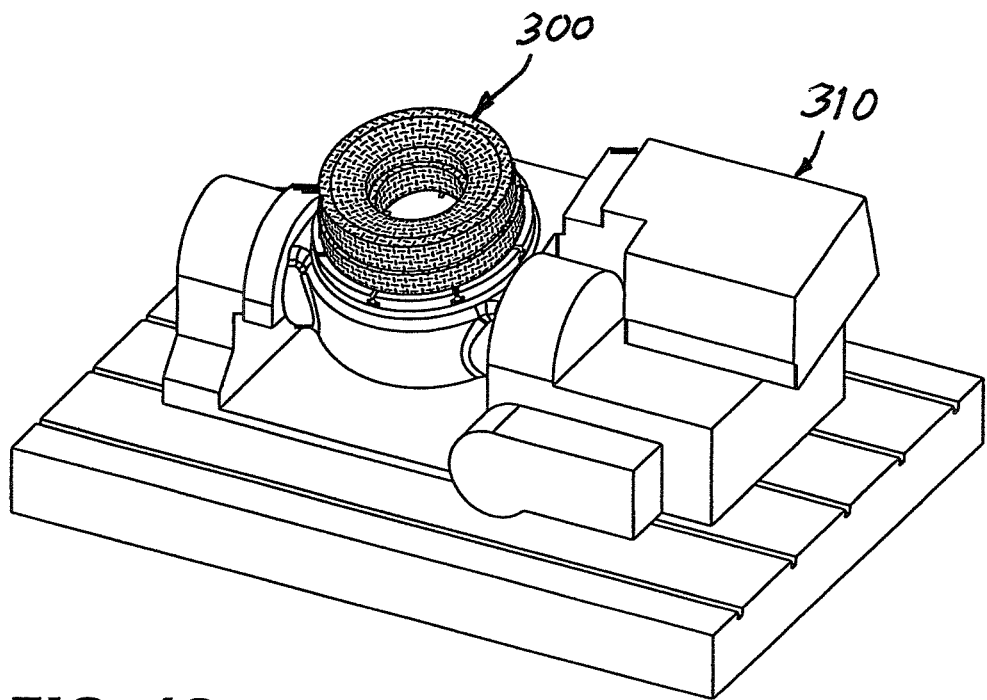
FIG. 12 is a diagrammatic pictorial illustration of another operation carried out in accordance with the present invention.
Figure 13:
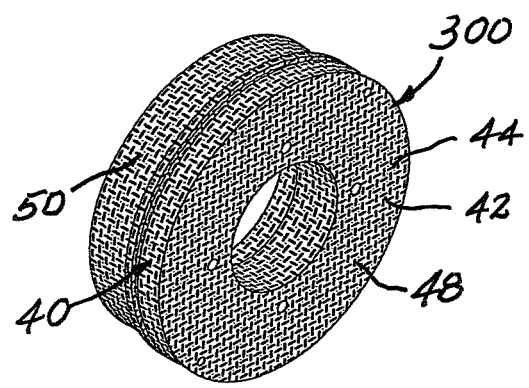
FIG. 13 is a pictorial illustration of a pump casing back plate constructed in accordance with the procedure of the present invention.

Turning now to FIGS. 12 and 13, still another component part of a pump is shown in the form of a pump casing back plate 300 constructed through utilization of much the same procedure; that is, blank 94 has been placed into a computerized numerically controlled (CNC) machining apparatus 310 where a computer controlled sequence of operations has machined the basic configuration of the pump casing back plate 300. Here once again, the unitary, composite construction provided to the pump casing back plate 300 establishes a mechanical component part of high strength and exceptional durability. The nature of the composite material enables a high degree of resistance to wear, abrasion and corrosion. The mutually perpendicular arrangement of the reinforcing fibers 42, 44, and 50 in the matrix 48 of synthetic polymeric material provides added strength and rigidity for exemplary performance, as well as increased durability for a long service life.

In short, while the above described embodiments of the invention illustrate improvements in certain component parts of a pump, it will be apparent that the improvements relate to additional component parts of a pump, such as impeller rings, valve casings and other pump component parts in which axially extending elements, such as impeller vanes and diffuser vanes, are constructed unitary with a radially extending element, such as a rotor, in an effective, one-piece construction of exceptionally high strength operating with increased efficiency, reduced noise and exceptional durability.

It will be apparent that the present invention attains the objects and advantages summarized above, namely: Provides a structural composite of strength and durability, reinforced in directions commensurate with the configuration of the component constructed from the structural composite; enables the reinforcement of a mechanical component in three mutually perpendicular directions by virtue of reinforcing fibers being continuously interwoven in a tri-dimensional weave, without discontinuities in a fiber in any one direction in any one plane, for enhanced strength and durability in mechanical components constructed from structural composites; enables the reinforcement of a mechanical component in three mutually perpendicular directions for enhanced strength and durability in mechanical components constructed of structural composites having a matrix of synthetic polymeric materials; provides mechanical component parts constructed of structural composites that impart to the component parts insulating properties which avoid galvanic corrosion or electrolysis that otherwise would affect longevity and performance of the component parts; provides an improved impeller and pump casing construction in which the configuration of corresponding vanes enables increased efficiency, reduced noise, reduced vibration, and reduced cavitation; provides pumps with component parts having greater wear resistance for effective operation with more abrasive fluids; provides pumps with component parts having greater resistance to corrosion; enables the economical manufacture of mechanical components, and especially impellers and related component parts of pumps, of uniform high quality and rugged construction for exemplary performance over an extended service life.

It is to be understood that the above detailed description of preferred embodiments of the invention are provided by way of example only. Various details of design, construction and procedure may be modified without departing from the true spirit and scope of the invention, as set forth in the appended claim.

The embodiments of the invention in which an exclusive property or privilege is claimed are defined as follows:

1. In an impeller having a rotor extending in radial directions from a central axis to an outer periphery and a plurality of vanes unitary with the rotor and extending from the rotor in axial directions essentially parallel to the central axis, each vane having a length along an axial direction, reinforcing fibers extending within each vane, along the length of each vane, essentially parallel to the length of the vanes, and into the rotor, the improvement wherein each vane extends between the central axis and the outer periphery along a volute defined by the mathematical formula $$Y = e^{(0.01a)} \times (5/8)(r) \times \cos(\theta) + (1/2)$$

$$X = e^{(0.01a)} \times (r) \times \sin(\theta) + (3/4)$$

Where $a = (33/64) \times (r)$; $r = $ radius; $e = 2.718$.

* * * * *